(12) United States Patent
Sutton et al.

(10) Patent No.: US 8,909,985 B2
(45) Date of Patent: Dec. 9, 2014

(54) MULTIPLE HYPERSWAP REPLICATION SESSIONS

(75) Inventors: Peter G. Sutton, Lagrangeville, NY (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/547,564

(22) Filed: Jul. 12, 2012

(65) Prior Publication Data

US 2014/0019801 A1   Jan. 16, 2014

(51) Int. Cl.
*G06F 11/16* (2006.01)

(52) U.S. Cl.
USPC .......................................................... 714/6.3

(58) Field of Classification Search
CPC ............ G06F 11/2069; G06F 11/2058; G06F 11/2082; G06F 11/2076; G06F 11/2056; G06F 11/16; G06F 11/2092; G06F 3/0647
USPC ....................................................... 714/1–57
See application file for complete search history.

(56) References Cited

U.S. PATENT DOCUMENTS

| | | | |
|---|---|---|---|
| 7,043,665 B2 * | 5/2006 | Kern et al. | 714/5.11 |
| 7,188,272 B2 | 3/2007 | Bartfai et al. | |
| 7,275,178 B2 | 9/2007 | Inoue et al. | |
| 7,376,859 B2 * | 5/2008 | Boyd et al. | 714/3 |
| 7,467,168 B2 * | 12/2008 | Kern et al. | 1/1 |
| 7,519,851 B2 | 4/2009 | Kitamura | |
| 7,603,581 B2 | 10/2009 | Boyd et al. | |
| 7,627,729 B2 | 12/2009 | Bartfai et al. | |
| 7,627,775 B2 | 12/2009 | Kern et al. | |
| 7,793,148 B2 | 9/2010 | Beardsley et al. | |
| 2004/0078632 A1 * | 4/2004 | Infante et al. | 714/5 |
| 2004/0260899 A1 * | 12/2004 | Kern et al. | 711/162 |
| 2005/0055603 A1 * | 3/2005 | Soran et al. | 714/7 |
| 2006/0161700 A1 * | 7/2006 | Boyd et al. | 710/61 |
| 2008/0065843 A1 * | 3/2008 | Bartfai et al. | 711/162 |
| 2011/0099360 A1 | 4/2011 | Bashir et al. | |

* cited by examiner

*Primary Examiner* — Nadeem Iqbal
(74) *Attorney, Agent, or Firm* — Cantor Colburn LLP; William A. Kinnaman, Jr.

(57) ABSTRACT

A method includes monitoring a plurality of HyperSwap sessions between one or more storage systems located at a first location and one or more storage systems located at a second location, wherein at least one of the one or more storage systems located at the first location and at the second location are designated as a primary storage system. The method includes detecting an error event and freezing communications between the storage systems located at the first location and the second location in response to the error event. The method also includes designating either the first location or the second location as a preferred location and modifying the designation of all of storage systems at the preferred location to be primary storage systems in response to the error event.

13 Claims, 14 Drawing Sheets

MULTIPLE HYPERSWAP REPLICATION SESSIONS

BACKGROUND

The present disclosure relates generally to methods and systems for controlling redundant storage systems, and more specifically, to an improved HyperSwap that supports multiple replication sessions.

HyperSwap is designed to broaden the continuous availability attributes of z/OS by extending the redundancy to storage systems. HyperSwap provides the ability to transparently switch all primary storage systems with the secondary storage systems for a planned reconfiguration and to perform disk configuration maintenance and planned site maintenance without requiring any applications to be quiesced. In addition, the HyperSwap operation can transparently switch to secondary storage systems in the event of unplanned outages of the primary storage systems. Unplanned HyperSwap support allows production systems to remain active during a disk storage system failure.

When a HyperSwap trigger events occurs, changes to data on the primary volumes is prevented by issuing command to freeze data across all volumes being mirrored (or replicated). The command to do this is issued for all Logical Subsystems (LSS) pairs that contain HyperSwap managed volumes, also referred to as devices. All I/O to all managed volumes is queued to maintain full data integrity and data consistency across all volumes. The HyperSwap operation then makes the target volumes available to be used and swaps information in internal control blocks to point to the recovered target volumes. When this has completed, all I/O is released and all applications continue to run against the recovered target volumes, thus masking or avoiding a complete disk system outage, with a dynamic 'busy' and a redirection of all I/O.

Many large storage systems host tens of thousands of volumes. Some servers may be accessing volumes in more than one storage system. Currently if one or more volumes in a storage system fail, all managed volumes of the failing storage system are HyperSwapped. This includes volumes on the failing storage subsystem not impacted by the failure, and other physical storage systems also unaffected by the failure. Using traditional HyperSwap to swap all volumes, instead of some subset of affected volumes takes more time to complete and increases the likelihood that a problem will occur during the swap.

BRIEF SUMMARY

According to one embodiment of the present disclosure, a method for managing a multi-session HyperSwap includes monitoring a plurality of HyperSwap sessions between one or more storage systems located at a first location and one or more storage systems located at a second location, wherein at least one of the one or more storage systems located at the first location and at the second location are designated as a primary storage system. The method includes detecting an error event and freezing communications between the storage systems located at the first location and the second location in response to the error event. The method also includes designating either the first location or the second location as a preferred location and modifying the designation of all of storage systems at the preferred location to be primary storage systems in response to the error event.

According to another embodiment of the present disclosure, a system includes a server and a first location including one or more storage systems in communication with the server, wherein each of the one or more storage systems includes a designation of a primary storage system or a secondary storage system. The system includes a second location including one or more storage systems in communication with the server, wherein each of the one or more storage systems includes the designation of the primary storage system or the secondary storage system. The system also includes one or more links operable for providing communication between the one or more storage systems at the first location and the one or more storage systems at the second location. The server includes a HyperSwap manager for monitoring a plurality of HyperSwap sessions between the one or more storage systems at the first location and the one or more storage systems at the second location. Either the first location or the second location is designated as a preferred location and in response to detecting an error event on the communication link, and the HyperSwap manager changes the designation of all of storage systems at the preferred location to the primary storage systems.

According to yet another embodiment of the present disclosure, a computer program product for managing a multi-session HyperSwap includes a computer readable storage medium having computer readable program code embodied therewith. The computer readable program code including computer readable program code configured to monitor a plurality of HyperSwap sessions between one or more storage systems located at a first location and one or more storage systems located at a second location, wherein at least one of the one or more storage systems located at the first location and at the second location are designated as a primary storage system. The computer readable program code configured to detect an error event and stop communications between the storage systems located at the first location and the second location in response to the error event. The computer readable program code is also configured to designate either the first location or the second location as a preferred location and modify the designation of all of storage systems at the preferred location to be primary storage systems in response to the error event.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
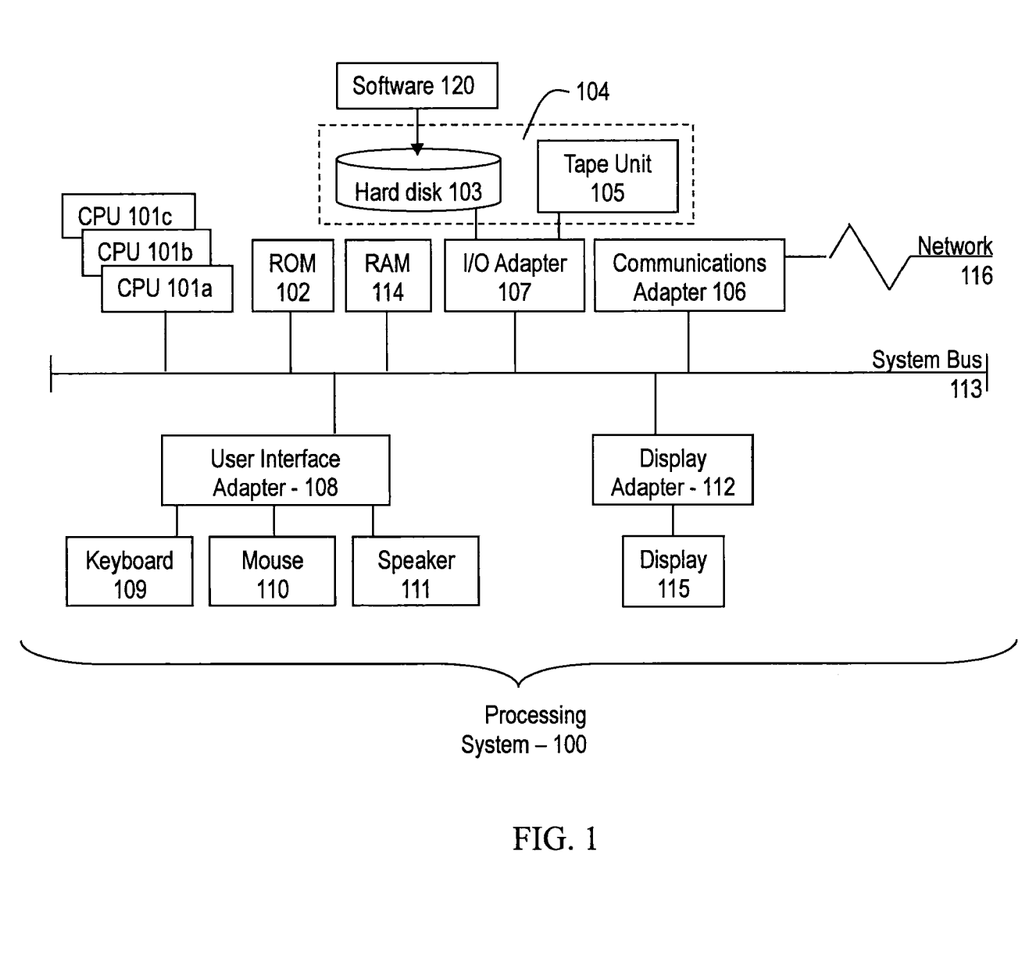
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) or Fibre Connection (FICON®) adapter that communicates with a hard disk 103 and/or tape storage drive 105 or any other similar component. I/O adapter 107, hard disk 103, and tape storage device 105 are collectively referred to herein as mass storage 104. Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the z/OS® and AIX® operating systems from IBM Corporation to coordinate the functions of the various components shown in FIG. 1.

With reference now to FIGS. 2A-2D, diagrams illustrating the steps of a HyperSwap operation are shown. The HyperSwap operation is executed on a server 200 which is capable of communicating with a first storage system 202 at a first site 212 and a second storage system 204 at a second site 214. The first storage system 202 and the second storage system 204 are also capable of communicating with each other over a link 206. The storage system and the HyperSwap operation are designed to minimize the data required to be resynchronized to a first storage system 202 after either a planned or unplanned outage of the first storage system 202. The HyperSwap operation can be used for both planned and unplanned outages when you want to suspend disk mirroring and make use of the second storage system 204.

Figure 2A:
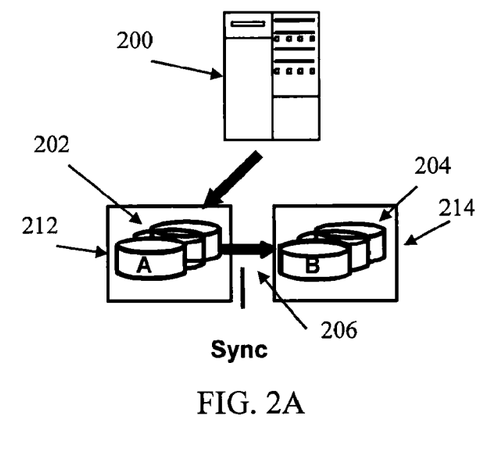
FIGS. 2A-2D are block diagrams of a system illustrating the steps of a HyperSwap operation.
Figure 2B:
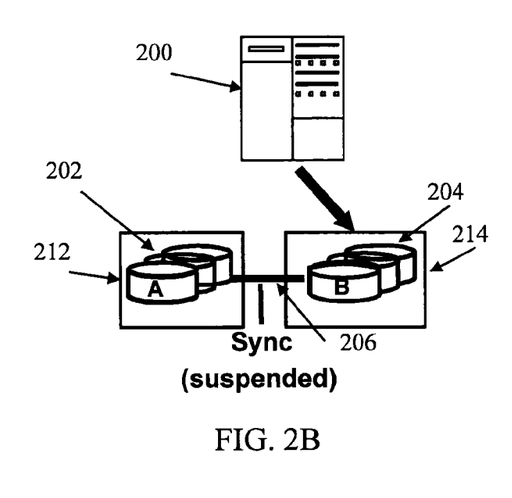

As illustrated best in FIG. 2A, during normal operation the server 200 utilizes the first storage system 202 at the first site 212, which is recognized as the primary storage system in the pair. The first storage system 202 at the first site 212 is synchronized with the second storage system 204 at the second site 214 via link 206. As shown best in FIG. 2B, once an error event, also referred to as a HyperSwap trigger event, occurs the synchronization process between the storage systems 202, 204 at the first site 212 and the second site 214 is suspended, the server 200 ceases communication with the first storage system 202 at the first site 212, the server 200 begins communication with the second storage system 204 at the second site 214 and the second storage system 204 becomes recognized as the primary storage system in the pair. While the synchronization process between the storage systems 202, 204 at the first site 212 and the second site 214 is suspended, the storage system at the second site 214 may track all changes that are made to the data. A HyperSwap may be triggered by events other than purely a storage failure. For example, a Hyperswap may be triggered by a failure of the links from the server 200 to the storage systems 202, 204. In addition, if the server 200 is connected to the storage systems 202, 204 through a switch, then the failure of one (or more likely more than one) switch, may make the storage inaccessible.

Figure 2C:
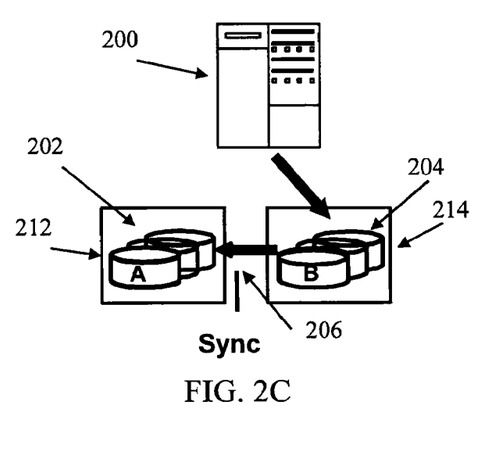
Figure 2D:
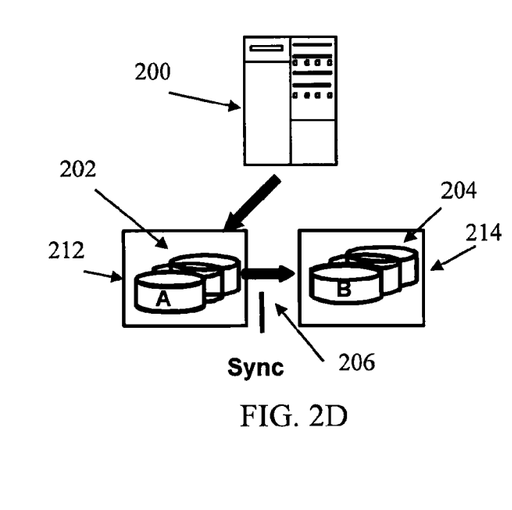

As illustrated best in FIG. 2C, when the first site 212 becomes available again, the changed data from the second storage system 204 at the second site 214 is synchronized to the first storage system 202 at the first site 212 via link 206. Only data which is known to have changed via tracking needs to be copied from the second site 214 to the first site 212, accordingly, the HyperSwap operation eliminates a full recopy of all data on all disk storage systems. When the data synchronization is complete, the session becomes enabled again for planned and unplanned HyperSwap events.

At some point the customer will want the first site 212 to again become the primary site and initiate a planned HyperSwap back. As illustrated best in FIG. 2D, the synchronization process between the storage systems at the second site 214 and the first site 212 is suspended, the server 200 ceases communication with the second storage system 204 at second site 214, and the communication paths from the server 200 to the first site 212 and from first site 212 to the second site 214 are reestablished and the storage system at the first site 212 is restored as the primary storage system the pair. Accordingly, the HyperSwap operation eliminates a full recopy of all data on all disk storage systems. Currently the HyperSwap operation does not support multiple sessions, e.g., the swapping of a subset of affected volumes rather than all volumes in a storage system, due to the risk of a specific problem that is discussed in more detail with reference to FIGS. 3A-3E.

Figure 5:
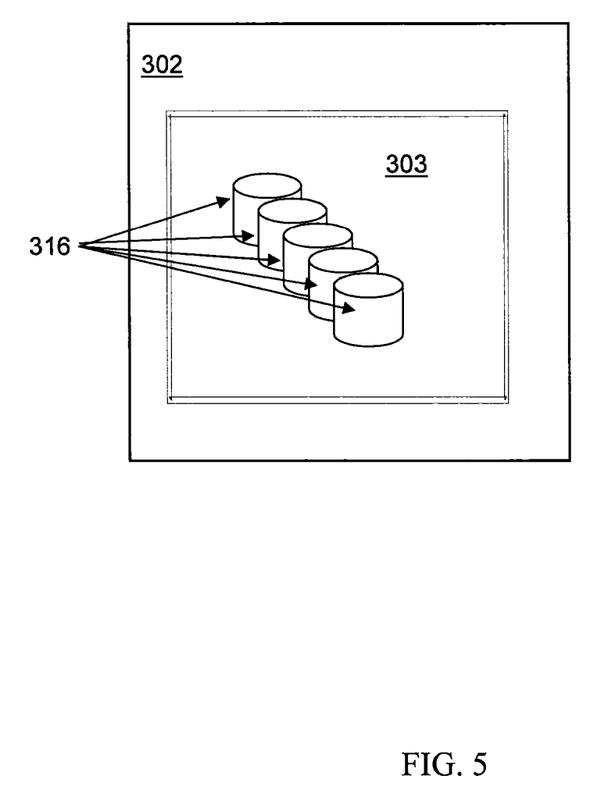
FIG. 5 is a block diagram illustrating an exemplary logical storage system in accordance with an exemplary embodiment.

Referring now to FIGS. 3A-3E, diagrams of a system 300 illustrating the steps of a traditional HyperSwap operation with multiple sessions are shown. The HyperSwap operation is performed by a server 301 which is capable of communication with one or more storage systems, 302, 304 at a first site 312 and with one or more storage systems 306, 308 at a second site 314. As shown, the solid lines between server 301 and storage systems 302, 304 indicate that the server 301 is actively communicating with the storage systems 302, 304 and the dashed lines between server 301 and storage systems 306, 308 indicate that the server 301 is not actively communicating with the storage systems 306, 308 but that a physical and logical link between them exists. Each of the storage systems 302, 304, 306, 308 may contain one or more logical storage systems (LSSs) 303, 305, 307, 309, respectively. In addition, the LSSs 303, 305 at the first site 312 are capable of communicating with the LSSs 307, 309 at the second site 314 via one or more communications links 310. Each of the LSSs 303 may contain one or more volumes 316, as shown in FIG. 5. All of the primary volumes and secondary volumes in an LSS pair (303-307) communicate with each other using the communication link(s) assigned to that LSS pair (310).

Figure 3A:
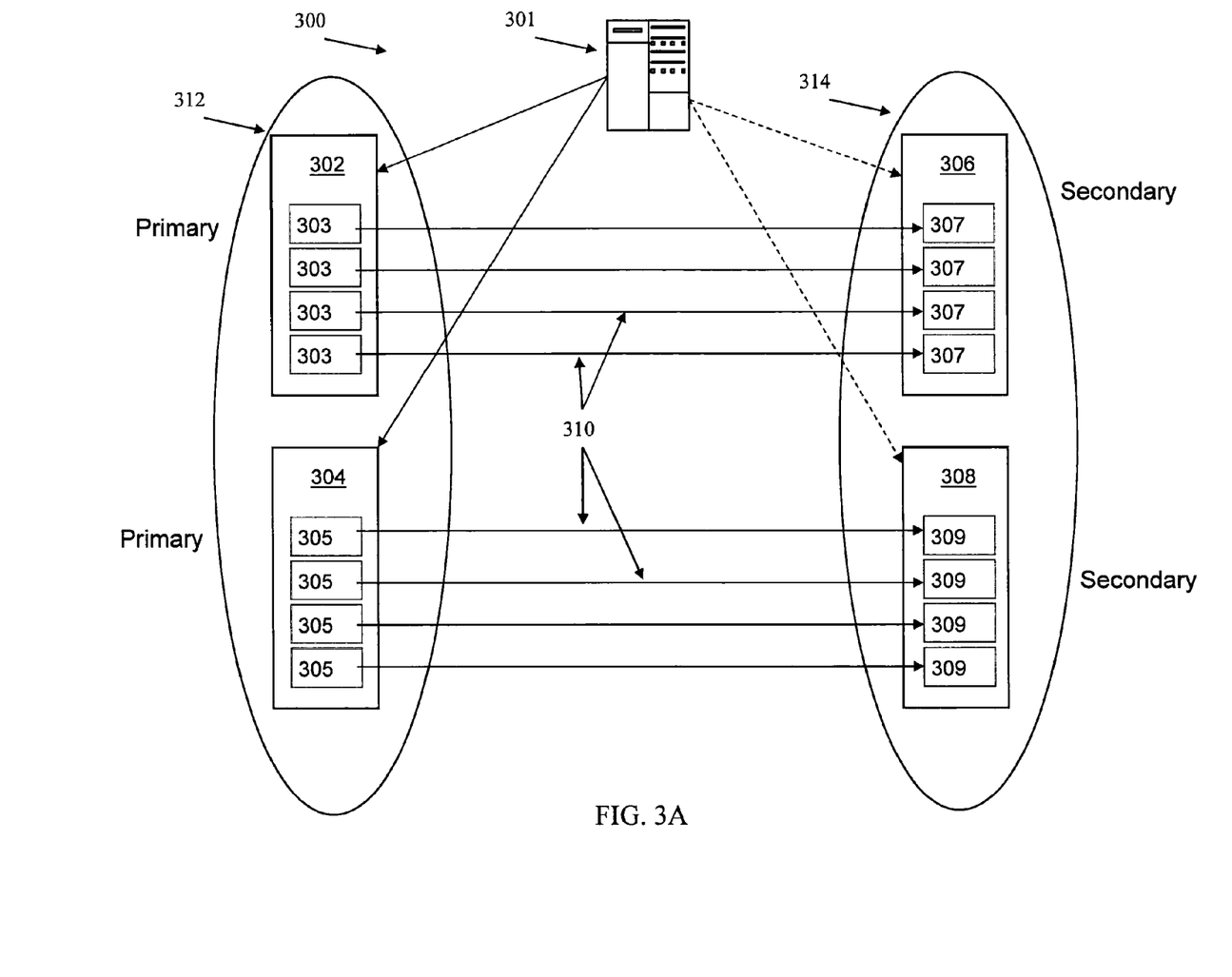
FIGS. 3A-3E are block diagrams of a system illustrating the steps of a traditional HyperSwap operation with multiple sessions.

As shown in FIG. 3A, the system 300 includes a first HyperSwap session including volumes in LSS 303 in storage system 302 synchronizing, or replicating, from the first site 312 with volumes in LSS 307 in storage system 306 at the second site 314. The system 300 also includes a second HyperSwap session including volumes in LSS 305 in storage system 304 synchronizing, or replicating, from the first site 312 with volumes in LSS 309 in storage system 308 at the second site 314. As illustrated, the storage systems 302, 304 that are in communication with the server 301 and are designated as the primary storage systems and the storage systems 306, 308 being replicated, or synchronized, from the primary storage systems are designated as the secondary storage systems.

Figure 3B:
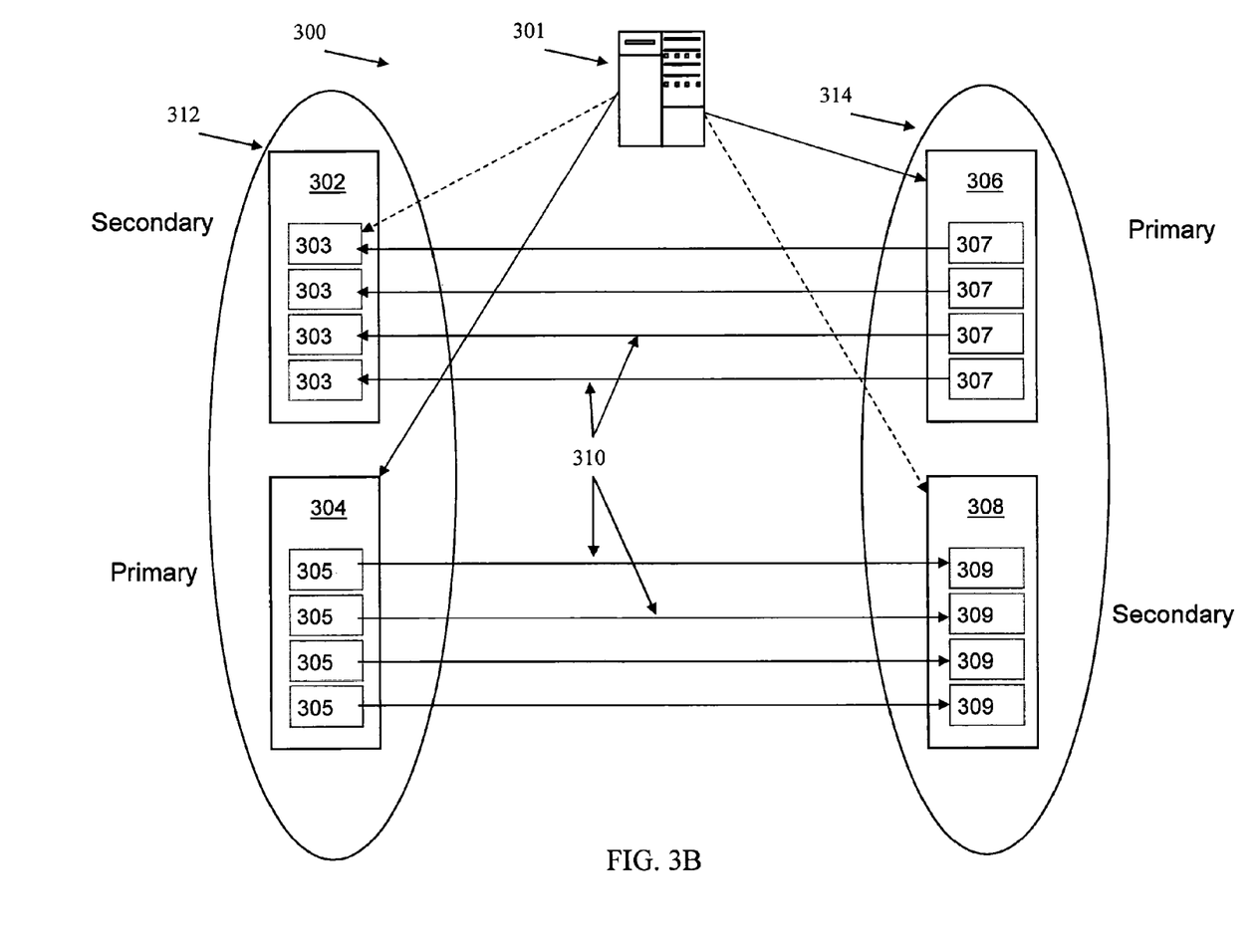
Figure 3C:
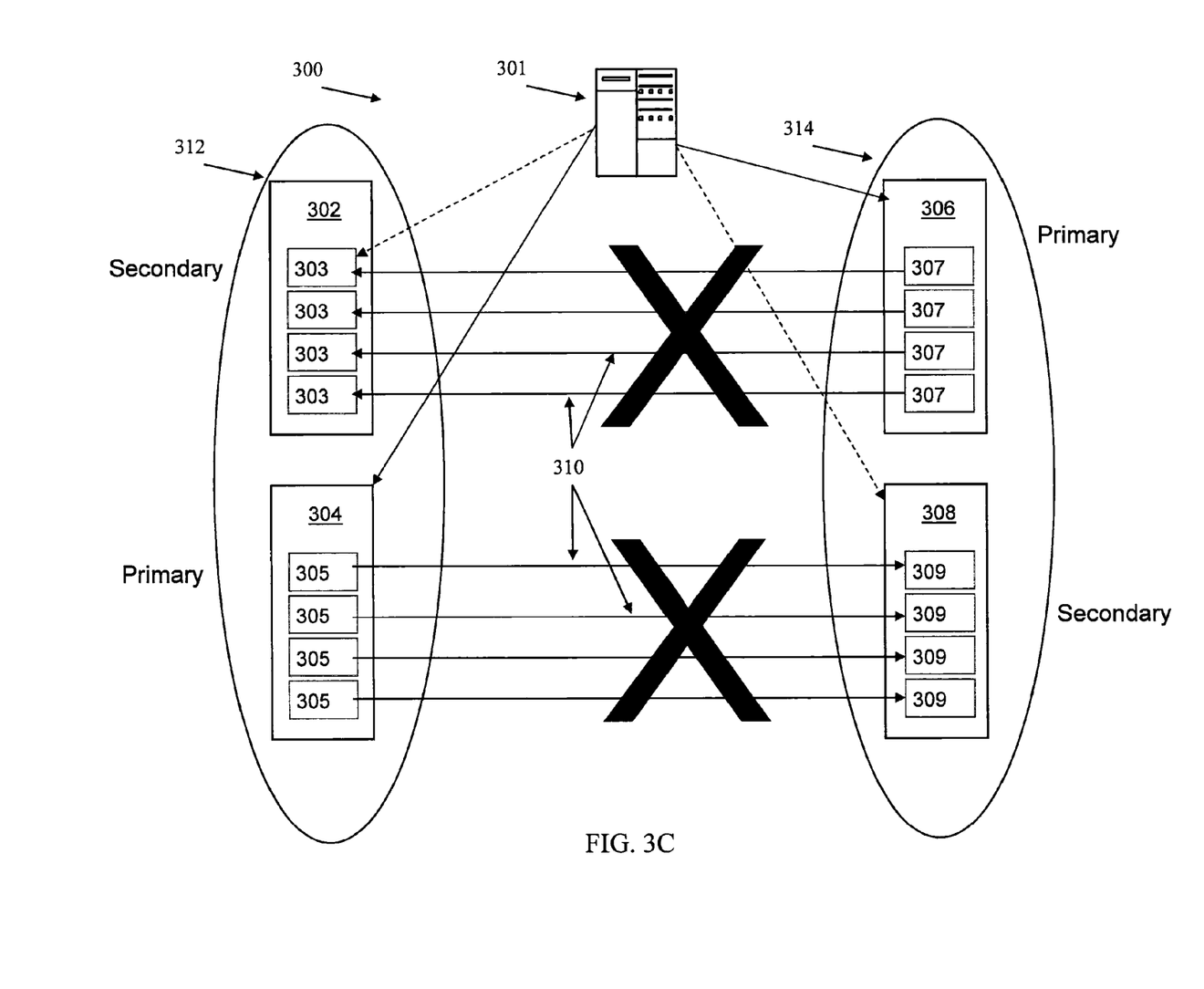

In the event that the server 301 executes a HyperSwap operation on one but not both sessions at the same time, replication for the second session may be going from storage system 304 at the first site 312 to storage system 308 at the second site 314, while replication for the first session is going from storage system 306 at the second site 314 to storage system 302 at the first site 312, as illustrated in FIG. 3B. When this situation occurs, some of the primary volumes are located at the first site 312 and some are located at the second site 314. Once an error event, such as a failure of the communications link 310, is detected all of the HyperSwap sessions are disabled. In this case, as illustrated in FIG. 3C, if one of the links 310 between the first site 312 and the second site 314 becomes suspended such that one of more LSS pairs 303-307 or 305-309 can no longer mirror their volumes, the HyperSwap operation will suspend all links 310 between the first site 312 and the second site 314 in the corresponding session to assure that the volumes at the secondary sites are data consistent. Data consistency may be assured by preventing any volumes in the HyperSwap session from copying to the secondary site unless all volumes in the HyperSwap session are copying. In this case, replication is no longer occurring from the primary volumes to the secondary volumes and the server 301 is updating only the primary volumes in storage systems 304, 306. The link between the first site 312 and the second site 314 can become suspended for various reasons, for example the link between the first site 312 and the second site 314 can be severed. Although the example shows that the HyperSwap sessions include only volumes and LSSs in a single storage system, it will be appreciated by one of ordinary skill in the art that volumes and LSSs from multiple storage systems may be included in a HyperSwap session and different volumes or LSSs from a single storage system can be included in separate HyperSwap sessions.

Figure 3D:
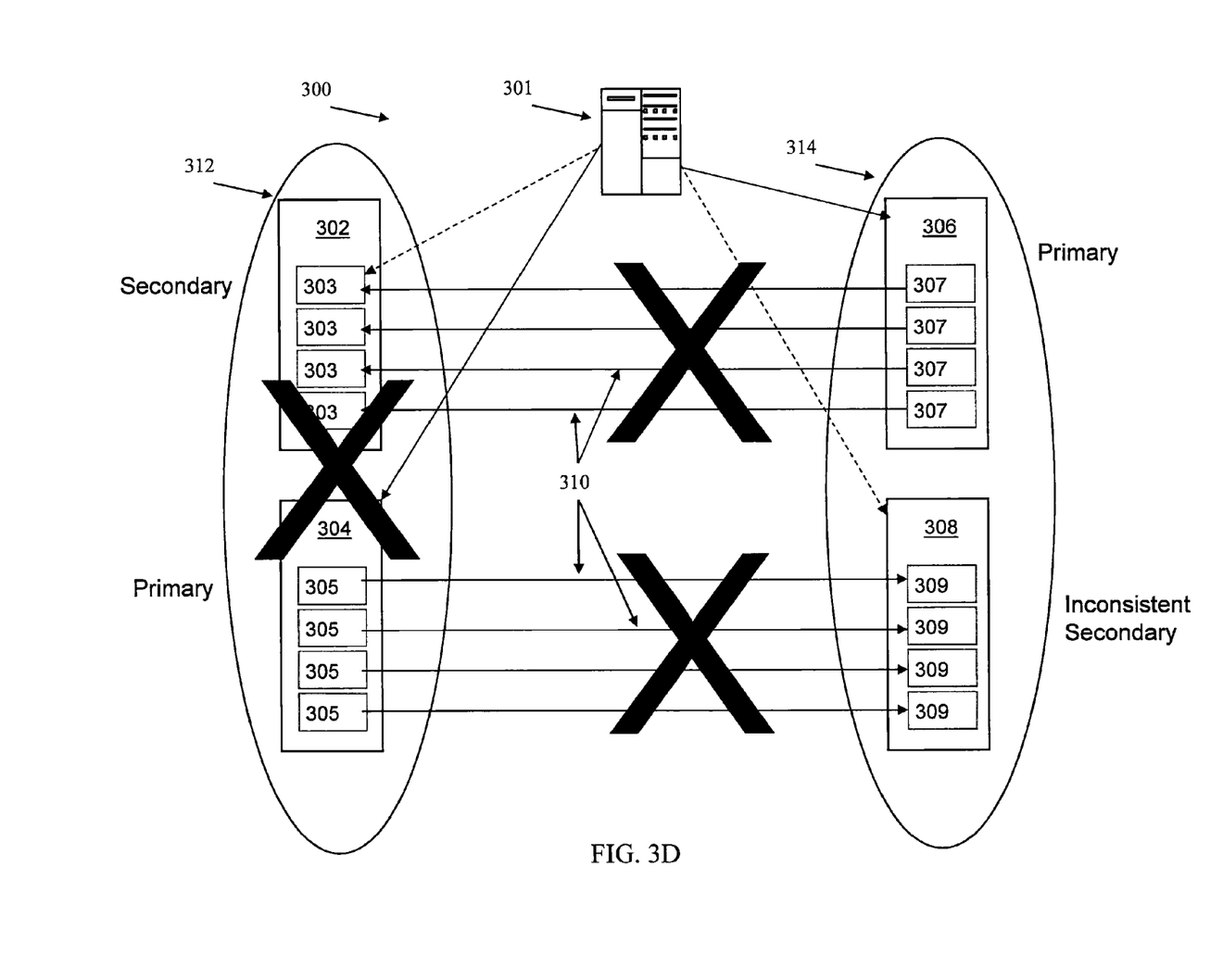
Figure 3E:
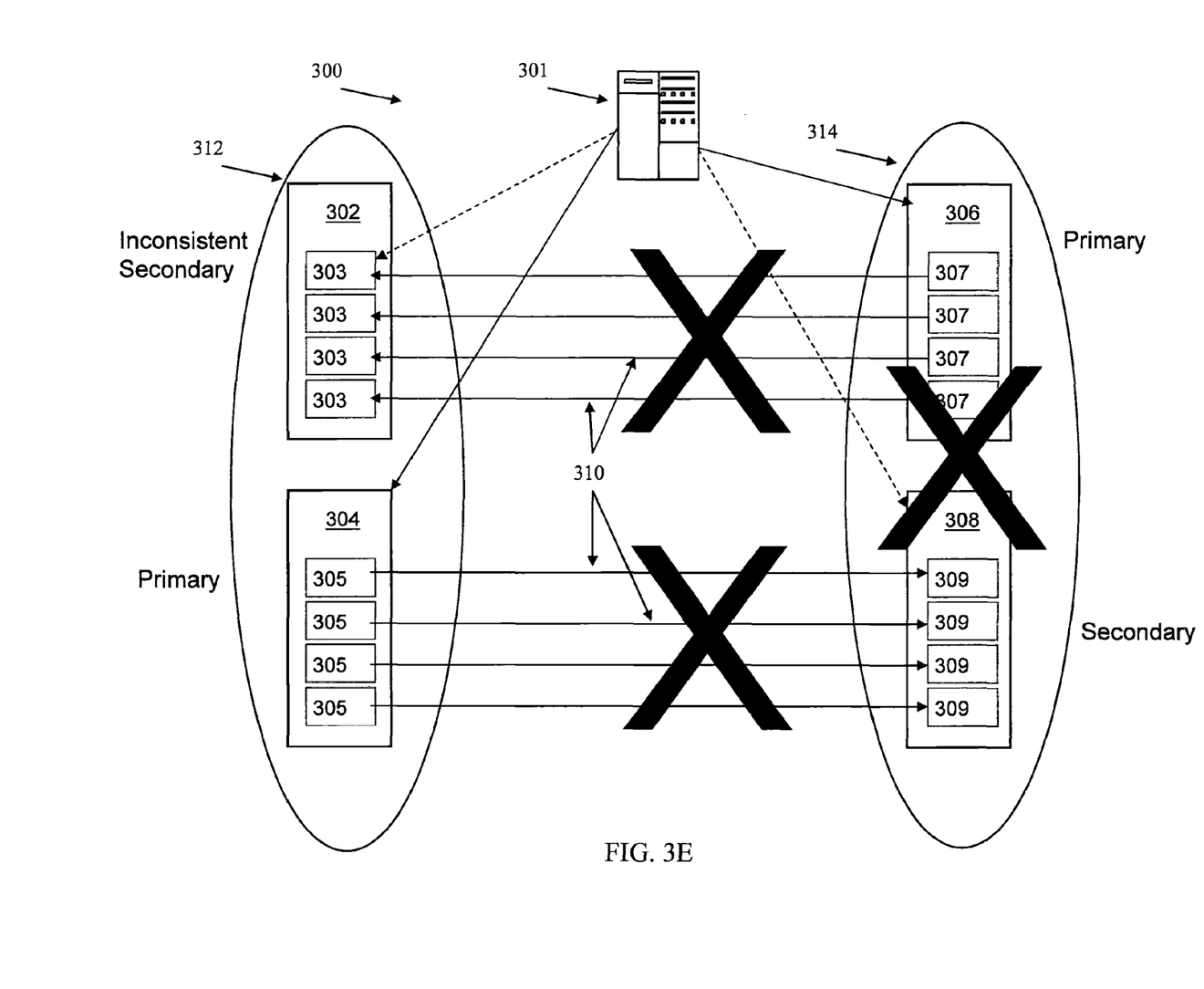

A problem may occur when a link failure is the first failure detected of an entire site failure. When this happens, if writes occur to the volumes after replication is suspended, and then shortly thereafter one of the sites goes down, neither site will have a point-in-time consistent, or data consistent, copy of the data. Accordingly, as illustrated in FIGS. 3D and 3E, no matter which site goes down after the link failure, the server 301 can not be brought up at the surviving the site because at least some subset of the data at that site is no longer current, and therefore all data is not point-in-time consistent. In order to avoid this problem, the server 301 currently only allows one HyperSwap replication session to be active at a given time.

Many disasters are rolling disasters and while the disaster may appear to be an instantaneous blackout of the entire site, the disaster actually takes time to "roll across the floor." For example the replication links may fail first, and HyperSwap may detect this condition, freeze (or suspend) all other replication links, and resume I/O, all before the storage systems and processors are impacted by the blackout a split-second later.

Referring now to FIGS. 4A-4F, diagrams of a system 400 illustrating the steps of a multi-session HyperSwap operation in accordance with an exemplary embodiment are shown. The multi-session HyperSwap operation may be performed by a HyperSwap manager 415 located on a server 401 which is capable of communication with one or more storage systems 402, 404 at a first site 412 and with one or more storage systems 406, 408 at a second site 414. The HyperSwap manager 415 also includes a designating of either the first site 412 or the second site 414 as a preferred site. Each of the storage systems 402, 404, 406, 408 may contain one or more LSSs 403, 405, 407, 409, respectively. In addition, the storage systems 402, 404 at the first site 412 are capable of communicating with the storage systems 406, 408 at the second site 414 via communications link 410.

Figure 4A:
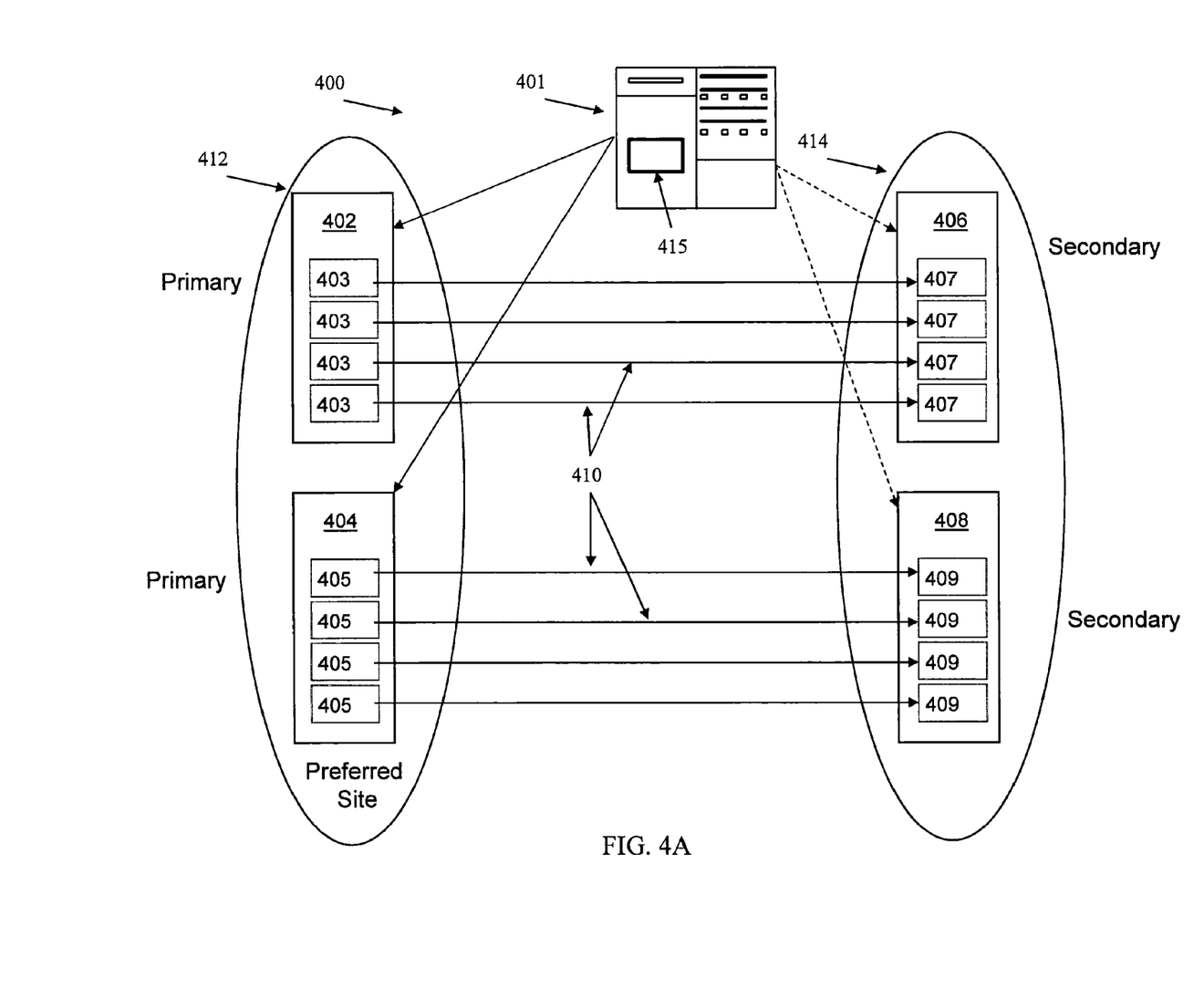
FIGS. 4A-4F are block diagrams of a system illustrating the steps of a multi-session HyperSwap operation in accordance with an exemplary embodiment.

As shown in FIG. 4A, the system 400 includes a first session including storage system 402 synchronizing, or replicating, from the first site 412 with storage system 406 at the second site 414. The system 400 also includes a second session including storage system 404 synchronizing, or replicating, from the first site 412 with storage system 408 at the second site 414. As illustrated, the storage systems 402, 404 that are in communication with the server 401 are designated as the primary storage systems and the storage systems 406, 408 being replicated, or synchronized, from the primary storage systems are designated as the secondary storage systems. In addition, the first site 412 is designated as the preferred site.

Figure 4B:
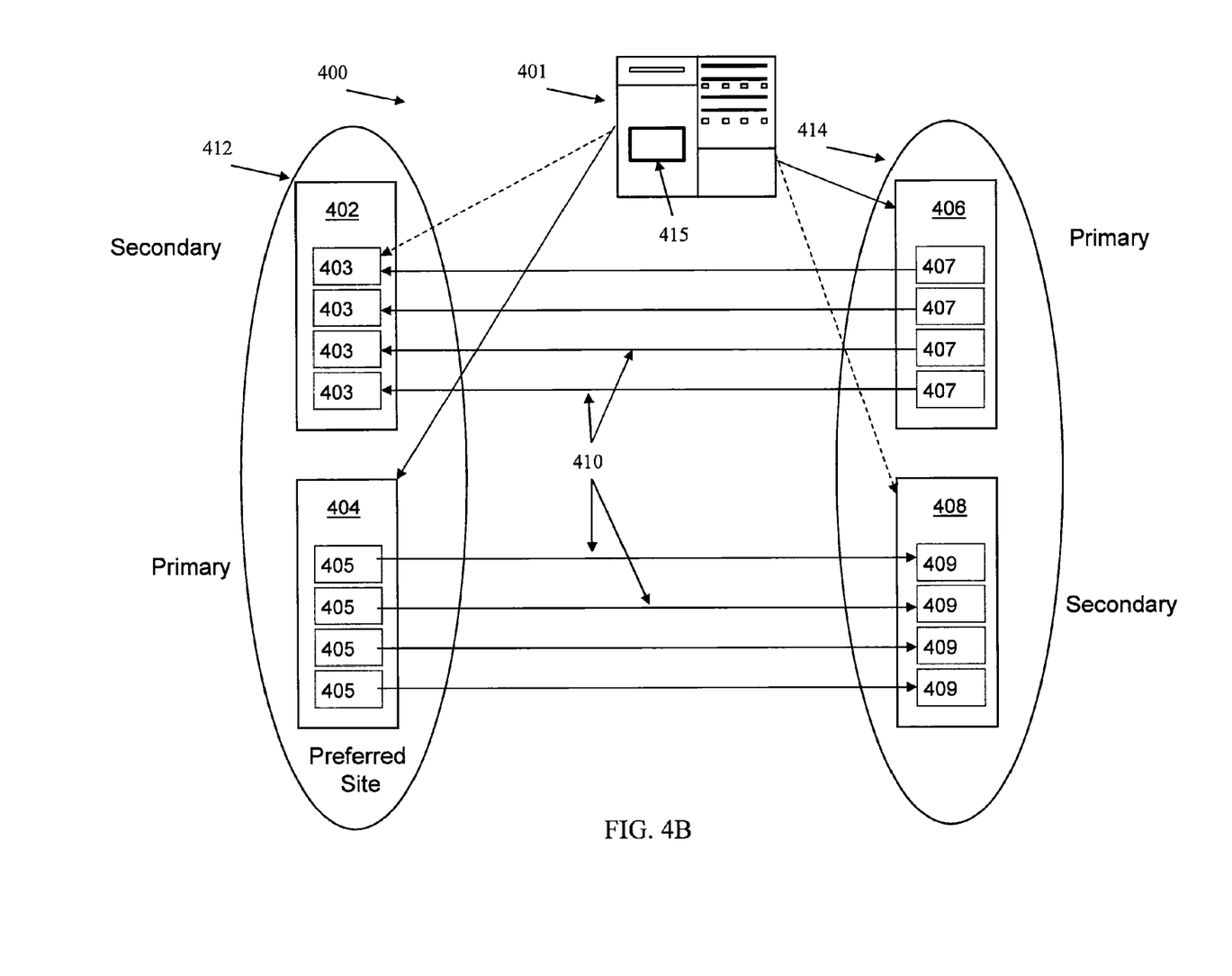
Figure 4C:
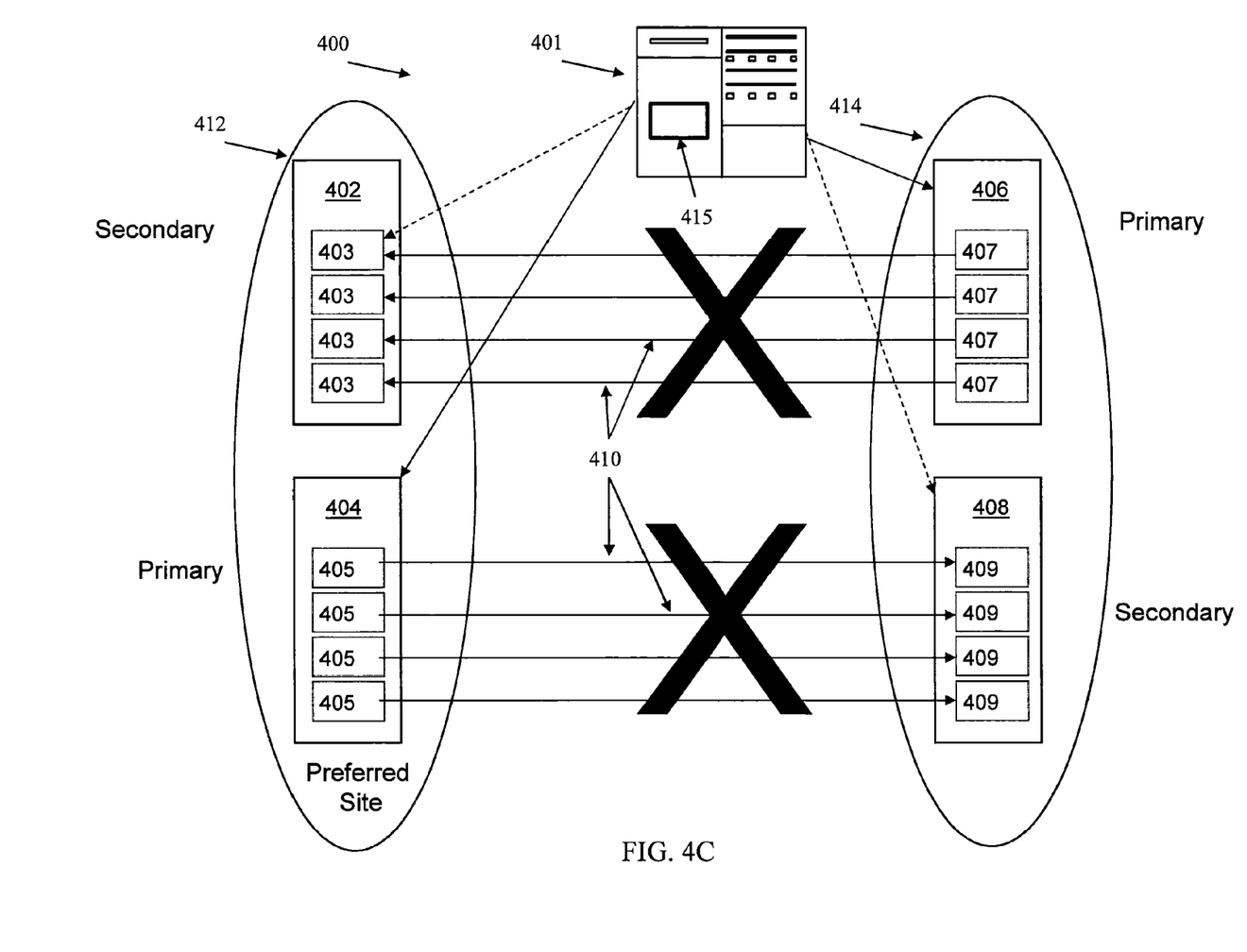
Figure 4D:
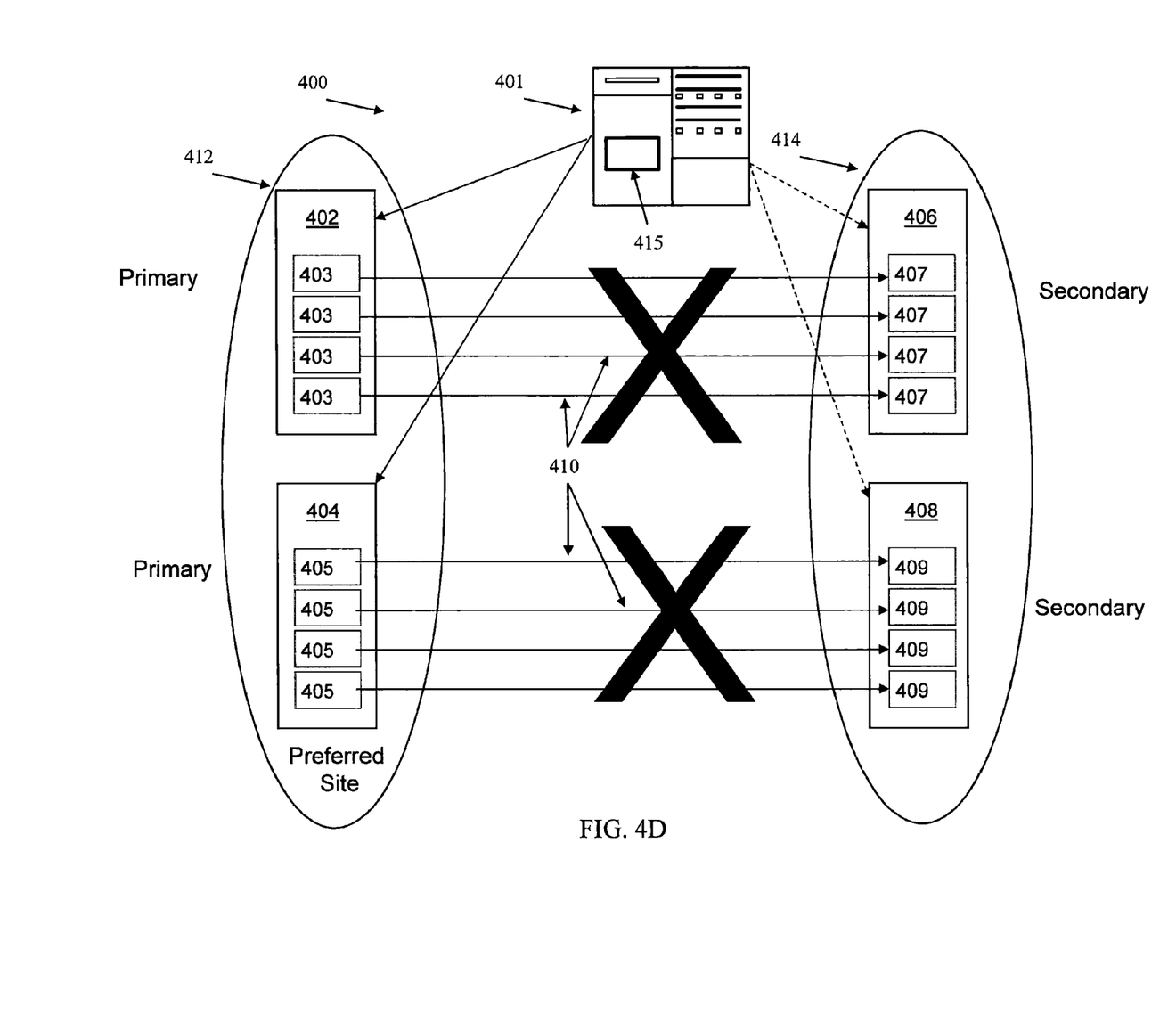

In the event that the server 401 executes a HyperSwap operation on one but not both sessions at the same time, replication for the second session may be going from storage system 404 at the first site 412 to storage system 408 at the second site 414, while replication for the first session is going from storage system 406 at the second site 414 to storage system 402 at the first site 412, as illustrated in FIG. 4B. When this situation occurs, some of the primary volumes are located at the first site 412 and some are located at the second site 414. In this case, as illustrated in FIG. 4C, if one of the links 410 between the first site 412 and the second site 414 becomes suspended such that one of more LSS pairs 403-407 or 404-408 can no longer mirror their volumes, the HyperSwap manager 415 will suspend all links 410 between the first site 412 and the second site 414 across all sessions to assure that the volumes at the secondary site are data consistent. Additionally, the HyperSwap manager 415 will also reassign all volumes at the preferred to be primary volumes, as shown in FIG. 4D. Since at the time the error was detected, the primary and secondary volumes for all HyperSwap sessions are identical copies of each other, the server 401 can use either the volumes at the first site 412 or at the second site 414 as primary volumes and be assured of no data loss. Once the HyperSwap manager 415 reassigns all volumes at the preferred to be primary volumes, the server 401 may resume updating the primary volumes.

Figure 4E:
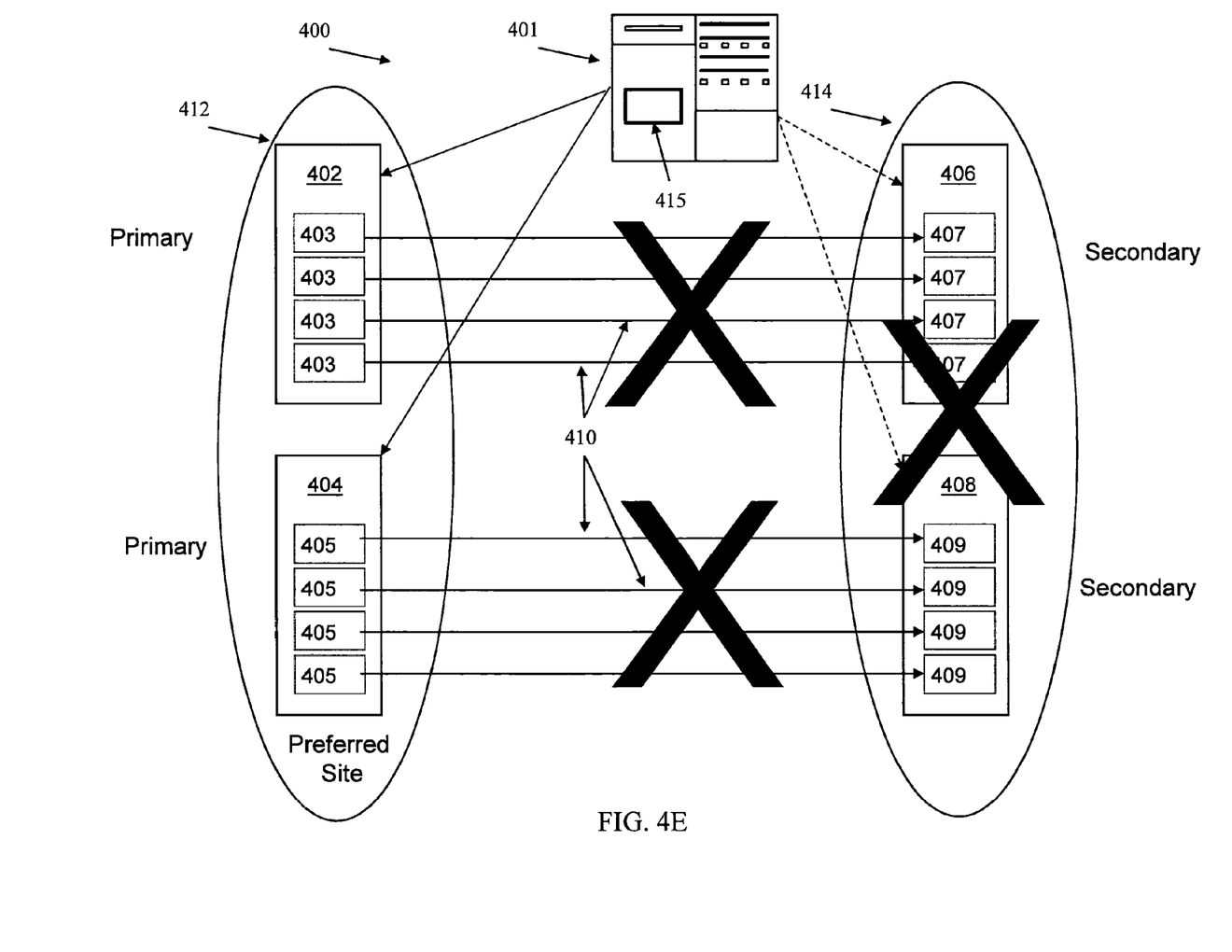
Figure 4F:
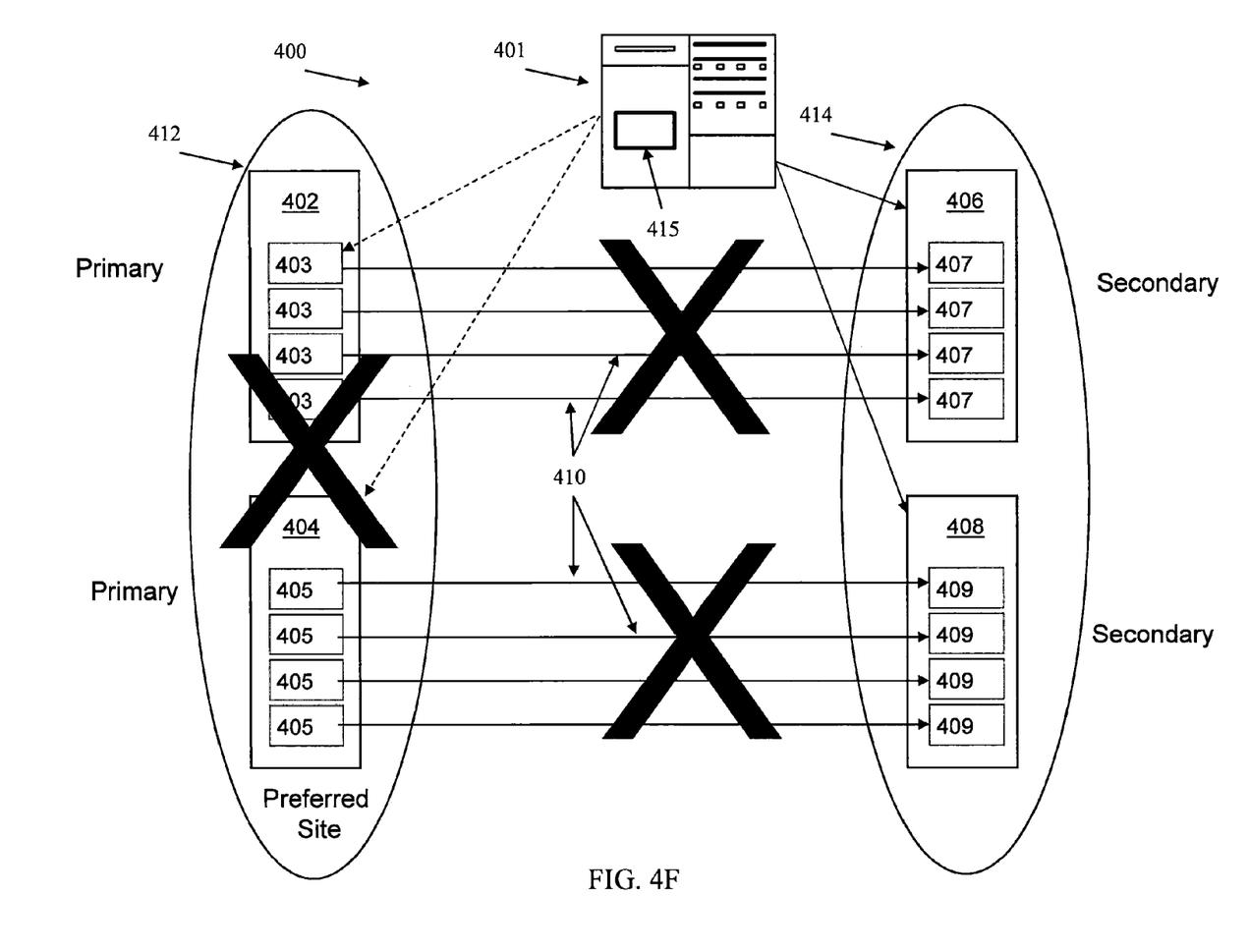

A detected error event can be an error on the communications link or a disk failure at a secondary site, in addition the source or type of the error event may not be known at the primary site. If the problem causing the link failure was actually the first error detected of an entire site failure of the non-preferred site 414, then there is no impact on the preferred site 412 and the workload continues to run unaffected, as illustrated in FIG. 4E. However, if the link failure is the first failure detected of an entire site failure of the preferred site 412, as illustrated in FIG. 4F, then systems at the non-preferred site 414 can be restarted using the secondary volumes at the non-preferred site 414. Some data may be lost, since the non-preferred site 414 was no longer receiving updates from the preferred site 412, however the data will at least be point-in-time consistent and therefore recoverable. If the link failure is no more than that, and both sites remain operational, then all systems at the preferred site 412 will continue unaffected by the failure.

In an exemplary embodiment, in addition to allowing a user to select which site is the preferred site, the user may allow the HyperSwap manager 415 on the server 401 to automatically determine a preferred site when the freeze trigger, or error event, is detected. The HyperSwap manager 415 may be designed to select the site that will most likely result in the quickest failover, based upon a set of attributes which may include storage technology, number of primary LSSs at each site, and number of primary volumes at each site. In another embodiment, the HyperSwap manager 415 may be designed to select the site that will be the preferred site based on the distance between the server 401 and the site. In one example the distance between the first site 412 and the second site 414 could be up to two hundred kilometers, if the server 401 is located at the first site 412, the preferred site should be 412, since the speed of light can noticeably impact the response time of I/O requests at these distances. In exemplary embodiments, the distance between the server 401 and the first and second sites 412, 414 may be determined based up on a command response time.

In another exemplary embodiment, the HyperSwap manager 415 may monitor the status of all HyperSwap sessions both active and inactive in the system 400, and may override the user's designation of a preferred site. In one embodiment, the preferred site may be overridden if the HyperSwap manager 415 determines that replication is not active for one or more replication sessions, and the primary volumes for all of these sessions could only be moved to the non-preferred site. For example, consider that some storage systems at the preferred site are down, but all storage systems at the non-preferred site are working. In this case it makes sense to designate the preferred site to be the site where all storage controllers are working. By overriding the user selected preferred site in this case, swapping over to a site that does not have access to all primary volumes is avoided.

In exemplary embodiments, the multi-session HyperSwap operation allows users to define multiple HyperSwap sessions while still maintaining the data integrity and ability to recover at a remote site, should a link failure precede a total site, or storage system, failure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising;
  a server;
  a first location including one or more storage systems in communication with the server, wherein at least one of the one or more storage systems at the first location includes a designation of a primary storage system and at least one of the one or more storage systems at the first location includes a designation of a secondary storage system;
  a second location including one or more storage systems in communication with the server, wherein at least one of the one or more storage systems at the second location includes the designation of the primary storage system and at least one of the one or more storage systems at the second location includes a designation of the secondary storage system;
  a link operable for providing communication between the one or more storage systems at the first location and the one or more storage systems at the second location;
  wherein the server comprises a HyperSwap manager for monitoring a plurality of HyperSwap sessions between the one or more storage systems at the first location and the one or more storage systems at the second location;
  wherein either the first location or the second location is designated as a preferred location; and
  wherein in response to detecting an error event the HyperSwap manager changes the designation of all of storage systems at the preferred location to the primary storage systems.

2. The system of claim 1, wherein a user designates either the first location or the second location as the preferred location.

3. The system of claim 1, wherein the HyperSwap manager designates either the first location or the second location as the preferred location.

4. The system of claim 1, wherein each of the primary storage systems are synchronized with a corresponding secondary storage system prior to the detection of the error event.

5. The system of claim 3, wherein the designation of either the first location or the second location as the preferred location is performed in response to detecting an error at the first location or the second location.

6. The system of claim 3, wherein each storage system includes a plurality of volumes and wherein the designation of either the first location or the second location as the preferred location is based upon which location has a greater number of operational primary volumes.

7. A computer program product comprising:
a computer readable storage medium having computer readable program code embodied therewith, the computer readable program code comprising:
computer readable program code configured to:
monitor a plurality of HyperSwap sessions between one or more storage systems located at the first location and one or more storage systems located at a second location, wherein at least one of the one or more storage systems located at the first location and at the second location are designated as a primary storage system, wherein at least one of the one or more storage systems located at the first location and at the second location are designated as a secondary storage system, and wherein either the first location or the second location are designated as a preferred location;
detect an error event;
stop communications between the one or more storage systems located at the first location and the one or more storage systems located at the second location in response to the error event; and
modify the designation of all of the one or more storage systems at the preferred location to be primary storage systems in response to the error event.

8. The computer program product of claim 7, wherein designating either the first location or the second location as a preferred location is performed by a user.

9. The computer program product of claim 7, wherein designating either the first location or the second location as a preferred location is performed autonomously.

10. The computer program product of claim 7, wherein each of the primary storage systems are synchronized with a corresponding secondary storage system prior to the detection of the error event.

11. The computer program product of claim 9, wherein the designation of either the first location or the second location as the preferred location is performed responsive to detecting an error at the first location or the second location.

12. The computer program product of claim 11, wherein each storage system includes a plurality of volumes and wherein the designation of either the first location or the second location as the preferred location is based upon which location has a greater number of operational primary volumes.

13. The computer program product of claim 7, wherein the computer readable program code is further configured to disable the plurality of HyperSwap sessions in response to detection of the error event.

* * * * *